United States Patent
Eguchi et al.

(10) Patent No.: US 7,075,682 B1
(45) Date of Patent: Jul. 11, 2006

(54) FACSIMILE APPARATUS

(75) Inventors: Hiroshi Eguchi, Tokyo (JP); Masanori Okuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/571,849

(22) Filed: May 16, 2000

Related U.S. Application Data

(63) Continuation-in-part of application No. 09/045,648, filed on Mar. 20, 1998.

(30) Foreign Application Priority Data

Mar. 28, 1997 (JP) .................................. 9-077986

(51) Int. Cl.
*H04N 1/00* (2006.01)

(52) U.S. Cl. ...................... 358/434; 358/437; 358/468; 358/444; 358/405

(58) Field of Classification Search ................ 358/441, 358/406, 405, 412, 434–437, 468, 444, 404; 370/248, 241, 244; 379/100.05, 100.01, 379/100.06; 710/29; 371/241, 244, 248
See application file for complete search history.

(56) References Cited

U.S. PATENT DOCUMENTS

| | | | | |
|---|---|---|---|---|
| 4,654,718 A | * | 3/1987 | Sueyoshi | 358/257 |
| 5,289,582 A | * | 2/1994 | Hirata et al. | 710/29 |
| 5,321,688 A | * | 6/1994 | Nakano et al. | 370/244 |
| 5,351,134 A | * | 9/1994 | Yaguchi et al. | 358/435 |
| 5,661,568 A | * | 8/1997 | Ueno | 358/435 |
| 6,002,490 A | * | 12/1999 | Suzuki | 358/434 |

* cited by examiner

*Primary Examiner*—Cheukfan Lee
(74) *Attorney, Agent, or Firm*—Rabin & Berdo, P.C.

(57) ABSTRACT

According to ITU-T Recommendation V. 34, the origination modem and the destination modem implement an original negotiation for determining a transmission rate of facsimile communication by executing a training independent of any controller. If the line therebetween is disconnected due to a communication error without establishment of the negotiation, the communication management information storage RAM 13 stores the communication management information. Thereafter, the CPU 11 eliminates the negotiation peculiar to the modems pursuant to V. 34 for redialing. The CPU 11 performs a negotiation for controlling the modems and selects a transmission mode corresponding to a communication capability of the destination facsimile based upon Recommendations V. 17, V. 29, and V. 27 ter.

18 Claims, 12 Drawing Sheets

FIG. 12

| STATUS | FACTOR | ERROR CODE | PERMISSION/INHIBITION, INTERVAL, NUMBER OF REDIALING |
|---|---|---|---|
| BUSY | BUSY TONE | 1111 | OK, ARBITRARY, ARBITRARY |
| FREQUENT ERRORS | RTN | 3210 | OK, 5 MINUTE, 3 TIMES |
| ERROR IN TRAINING | FTT FALL BACK | 2345 | OK, 3 MINUTE, 5 TIMES |
| JAM/ABSENCE OF PAPER OR POWER FAILURE OF DEST FAX | NO REPLY 3 TIMES TO POST COMMAND | 3111 | OK, 15 MINUTE, 2 TIMES |
| POWER FAILURE OF ORIG FAX | POWER FAILURE | 3500 | OK, PROMPT, LIMITLESS |
| NO REPLY OR VOICE OF DEST FAX | TIMEOUT OF WAITING FOR LINE CONNECTION | 12AA | NG |
| CANCEL OF TRANSMISSION | CANCEL KEY | 1001 | NG |
| STOP OF TRANSMISSION | STOP KEY | 3A00 | NG |
| NO CONFIDENTIAL TRANSMISSION IN DEST FAX | NSF SIGNAL | 5678 | NG |
| NO TRANSFERENCE TRANSMISSION IN DEST FAX | | 5679 | NG |

FACSIMILE APPARATUS

This is a continuation-in-part of application Ser. No. 09/045,648, filed Mar. 20, 1998.

BACKGROUND OF THE INVENTION

1. Field of the Invention

The present invention relates to a facsimile apparatus, and more specifically to a transmission mode of a modem provided therein.

2. Description of the Prior Art

Recommendation V.34 of ITU-T (International Telecommunications Union-Telecommunications Standardization Sector), which was made in 1994, recommends a transmission procedure of a modem for use in a facsimile apparatus. Hereinafter, Recommendation V. 34 of ITU-T is referred to as V. 34. V. 34 is formally referred to as "The operation of modems at the data rate up to 28,800 bit/s for use in a telephone network or a 1—1 dedicated line in 2 line system." According to V. 34, the transmission at the rate up to 28,800 bps is advised to be achieved by measuring a line condition used therefor and adjusting parameters therefor based the line condition. The facsimile apparatus pursuant to V. 34 has a transmission control procedure according to the binary control procedure of Recommendation T. 30 "The procedure of facsimile transmission in a general telephone exchange network." To mutually confirm an operating procedure between an origination facsimile apparatus and a destination facsimile apparatus, the binary control procedure employs a frame structure of the High Level Data Link Control (HDLC) designed for data transmission.

The above facsimiles are provided with functions satisfying ITU-T Recommendation V. 8. Hereinafter, ITU-T Recommendation V. 8 is referred to as V. 8. V. 8 proposes a connection sequence of modems. According to V. 8, modems select from among several modes one that they utilize for transmission. Since the selection pursuant to V. 8 is essential for the procedure of V. 34, modems pursuant to V. 34 must be provided with functions of V. 8.

The facsimile having a modem with functions of V. 8 and V. 34 will be described below. In the event of transmission of information from an origination facsimile apparatus to a destination facsimile apparatus, prior to the Fax Handshaking procedure recommended by Recommendation T. 30 of ITU-T after establishment of a line therebetween, the modems in the facsimile apparatuses have a given sequence of implementing a negotiation, or an exchange of information to determine a transmission mode by themselves and thus, independent of a CPU (Central Processing Unit). This sequence of the negotiation corresponds to Phase 2 in V. 34 discussed below.

The modems having functions of V. 8 and V. 34 perform the following four phases: Phase 1 in V. 8, and Phases 2–4 in V. 34. During the phases, the modems remeasure the line condition and decide the parameters on modulation.

Next, Phase 2 in V. 34 will be described. According to Phase 2 in V. 34, fundamental items therein are set through probing the line and exchanging the parameters for modulation. First, in Phase 1 in V. 34, the connection between the origination modem and the destination modem starts. Thereafter, in Phase 2 of V. 34, after selecting a communication to mode according to V. 8, an exchange of the parameters on modulation is carried out between the origination modem and the destination modem. Subsequently, the origination modem sends a line probe signal for measurement of the line condition, which allows information to be exchanged on a symbol rate, a pre-emphasis, an available data rate, a carrier frequency, and a transmission level to be exchanged based upon the line condition and the INFO data. Thus, Phase 2 in V. 34 is completed, which commences Phase 3 in V. 34. Phase 2 in V. 34 will be discussed more specifically below. As explained above, it is the modems that execute the negotiation. Upon a failure to accomplish the negotiation, the modems spontaneously carry out a retrain, that is, a trial of another negotiation. However, if the line condition is bad due to a poor line or noise, for example, the modems cannot accomplish the negotiation. As long as the line condition is unchanged, the modems try retraining repeatedly.

Since the negotiation is independent of the CPU, the CPU does not assist the modems in performing the negotiation. To avoid repetition of retraining with the line connected, a timer monitors the period of Phase 2 of V. 34. If Phase 2 of V. 34 fails to be completed within a given period of time, the CPU disconnects the line as a communication error.

The facsimile apparatuses with such a timer can avoid the repetition of retraining over the connected line. However, every negotiation of the facsimile apparatuses through redialing after disconnection of the line fails while the line condition remains unchanged, which poses a problem that the facsimile apparatuses cannot complete Phase 2 of V. 34.

SUMMARY OF THE INVENTION

It is therefore an object of the present invention to provide a facsimile apparatus that is capable of avoiding useless repetition of retraining, and of establishing a communication.

According to one aspect of the present invention, there is provided a facsimile apparatus comprising: a modem which is connected with a line and carries out communication; a control circuit controlling operations of the modem and transmission and receipt of image data; and a communication management information storage circuit storing communication management information, wherein when training is carried out independently of the control circuit between the modem and a modem of a destination facsimile, to execute an original negotiation for determination of a data rate, and the line is disconnected due to a communication error without establishment of the original negotiation after connection of the line, the commutation management information storage circuit stores the communication management information on the communication error, then the control circuit eliminates the original negotiation of the modems, executes a negotiation controlling the modems, and selects a transmission mode corresponding to an available data rate based upon the result of the negotiation, to redial based upon the communication error with reference to the communication management information stored in the communication management information storage circuit.

According to another aspect of the present invention there is provided a facsimile apparatus comprising: a modem which is connected with a line and carries out communication; a control circuit controlling functions of the modem and transmission and receipt of image information; and a communication management storage circuit storing communication management information, wherein when training is carried out, independently of the control circuit between the modem and a modem of a destination facsimile, to execute an original negotiation for determination of a data rate, communication in a transmission mode corresponding to the data rate starts, and the line is disconnected due to a communication error, the communication management information storage circuit stores the communication management information about the communication error, then the control circuit eliminates the original negotiation of the modems, executes a negotiation controlling the modems, and selects a transmission mode corresponding to an available data rate based upon the result of the negotiation, to redial based upon the communication error with reference to the communication management information stored in the communication management information storage circuit.

According to a further aspect of the present invention, there is provided a facsimile apparatus comprising: a modem which is connected with a line and carries out communication; a control circuit controlling functions of the modem and transmission and receipt of image information; and a communication management storage circuit storing communication management information, wherein the control circuit executes the redialing control, according to the cause of the communication error, with reference to the communication management information stored in the communication management information storage circuit.

According to still another aspect of the present invention, there is provided a method of controlling facsimile communication, including a first control function that a modem in an origination facsimile apparatus and a modem in a destination facsimile apparatus carry out original training independently of a control circuit, execute a negotiation for determination of a transmission mode of a proper data rate upon connection of a line, and repeat training by establishment of the negotiation, and a second control function that the control circuit carries out a negotiation with the destination facsimile apparatus by controlling the modem in the origination facsimile apparatus and selects a suitable transmission mode among a plurality of transmission modes each having a different data rate, the method comprising the steps of upon eliminating the first communication control function reconnection of the line by redialing after disconnection of the line due to a communication error without establishment of the negotiation by the first communication control function; and then; and starting a negotiation according to the second communication control function.

According to still another aspect of the present invention, there is provided a method of controlling facsimile communication including a first control function that a modem in an origination facsimile apparatus and a modem in a destination facsimile apparatus carry out original training independently of a control circuit, execute a negotiation for determination of a transmission mode of a proper data rate upon connection of a line, and repeat training by establishment of the negotiation, and a second control function that the control circuit carries out a negotiation with the destination facsimile apparatus by controlling the modem in the origination facsimile apparatus and selects a suitable transmission mode among a plurality of transmission modes each having a different data rate, the method comprising the steps of upon exiting the first communication control function disconnection of the line due to a communication error after commencement of a communication through establishment of the negotiation of the first control function; and then starting a negotiation according to the second communication control function.

BRIEF EXPLANATION OF THE DRAWINGS

FIG. 11 is an explanatory diagram showing parameters used for the facsimile apparatus according to a third embodiment.

FIG. 12 is an explanatory diagram showing a process of preparing of error codes and a process of judging of redialing.

DESCRIPTION OF THE PREFERRED EMBODIMENTS

Hereinafter, the preferred embodiments of the facsimile apparatus according to the present invention will be described with reference to the accompanying drawings.

In the preferred embodiments, the facsimile apparatus in the origination station (hereinafter, referred to as "origination facsimile") and the facsimile apparatus in the destination station (hereinafter, referred to as "destination facsimile") employ modems provided with the functions of V. 8 and V. 34. Their transmission control procedure is carried out pursuant to V. 34, namely, "the binary control procedure" in "the document facsimile transmission procedure in general telephone exchange network." In addition differences between V. 34 and the latter Recommendations is as follows.

According to V. 34, after establishment of the connection between the origination facsimile and the destination facsimile, the modems therein execute a negotiation independent of CPUs, prior to the procedure of ITU-T Recommendation T. 30, Fax Handshaking. To the contrary, according to V. 17, V. 29, and V. 27 ter, after establishment of the connection, immediately the procedure of T. 30, Fax Handshaking is performed, in which procedure the origination and destination modems carry out a negotiation under control of the CPUs.

Pursuant to V. 34, the modems perform the negotiation by themselves, so that the modems can communicate at a higher data rate as compared with that possible with other modems. To the contrary, pursuant to other Recommendations, the modems performs the negotiation dependent upon the CPU. The data rates of those Recommendations are lower than that of V. 34 and also become lower in order of V. 17, V. 29, and V. 27 ter. This enables a transmission regardless of line conditions; the maximum data rates of V. 17, V. 29, and 27 ter are 14,400 bps, 9,600 bps, and 4,800 bps, respectively.

First Embodiment

Figure 1:
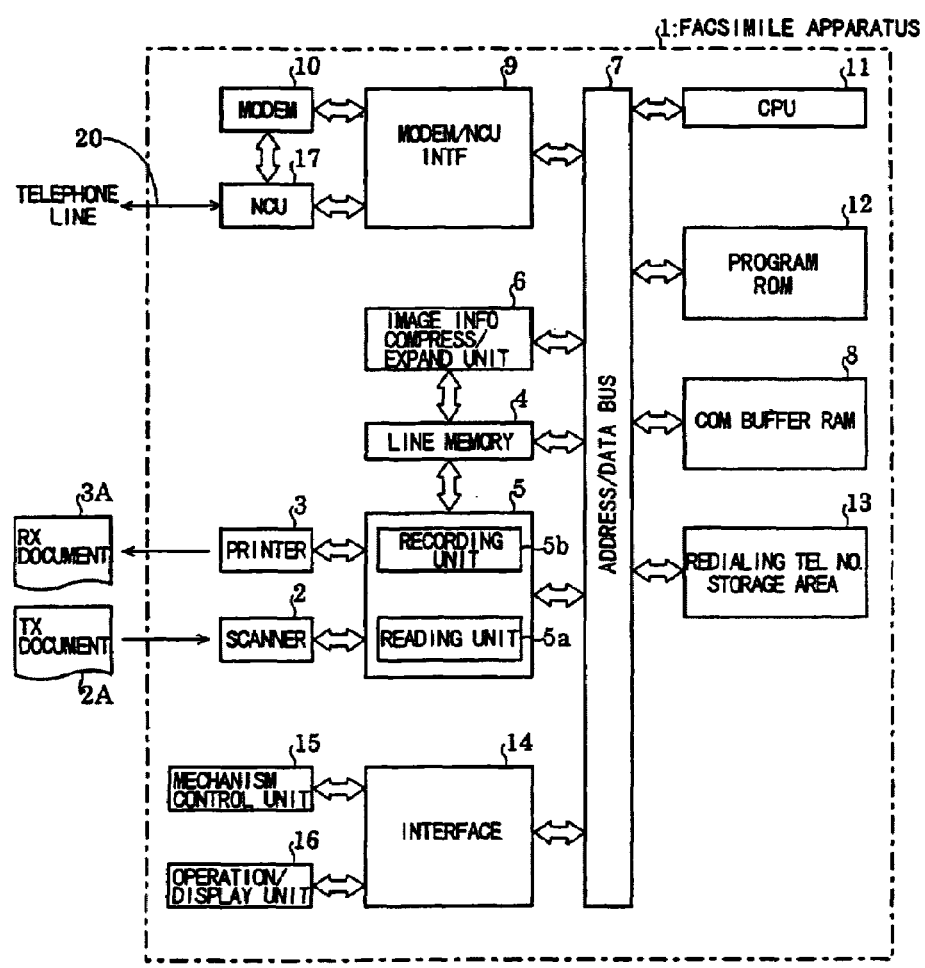
FIG. 1 is a block diagram showing a facsimile apparatus according to the first embodiment.

Hereinafter, the configuration of the facsimile apparatus will be described. In FIG. 1, the facsimile apparatus 1, which serves as a origination facsimile, incorporates the scanner 2, the printer 3, the reading unit 5a, and the recording unit 5b. The scanner 2 scans information on the transmission document 2A to transmit the information. The printer 3 prints information received from an opposite facsimile (not shown) on the receipt paper to produce a receipt document 3A. The reading unit SA processes information scanned by the scanner 2 to send the second information to the line memory 4 as image information. The recording unit 5b processes image information received from the line memory 4 and send it to the printer 3. The reading unit 5a and the recording unit 5b constitute the reading/recording processor 5.

In addition, the origination facsimile 1 includes the image information compressing/expanding unit 6, the transmission buffer RAM (Random Access Memory) 8, the MODEM 10, and the NCU (Network Control Unit) 17. According to the data compression mode, the image information compressing/expanding unit 6 compresses the image information which has been read from the line memory 4 to an image signal to transmit the latter to the opposite facsimile, and expands the image signal which has been received from the opposite facsimile. The transmission buffer RAM 8 stores an image signal to transmit via the address/data bus 7 which has been compressed by the image information compressing/expanding unit 6. The MODEM 10, which is provided with functions pursuant to V. 8 and V. 34, modulates an image signal with a control signal to be transmitted via the MODEM/NCU interface 9 which has been stored in the transmission buffer memory 8, and demodulates an image signal with a response signal which has been received from the opposite facsimile.

In receiving from the opposite facsimile, the transmission buffer RAM 8 serves as a receipt buffer, which stores the image signal and the response signal which have been demodulated by the MODEM 10. After storage, the image signal and the response signal are moved to the image information compressing/expanding unit 6 via the address/data bus 7.

The origination facsimile 1 further has the CPU 1, the program ROM (Read Only Memory) 12, the communication management information storage RAM 13, the mechanism control unit 15, and the operation display unit 16. The CPU 11 contracts the entire origination facsimile 1, manages the flow of signals, controls communication, and controls the entire network. The program ROM 12 stores the program data to be executed by the CPU 11. The communication management information storage RAM 13 stores a communication error flag, which will be described in detail later, and telephone numbers used for origination of calls. The mechanism control unit 15 and the operation/display unit 16 are connected to the address/data bus 7 via the interface 14. The mechanism control unit carries out control of drivers, sensors, and the like (not shown) that are human under the control of the CPU 11. The operation/display unit 16 has a interface, and more specifically notifies the CPU 11 of an instruction given by the operator to manipulate devices used for facsimile transmission, and receives the status of manipulation of the devices from the CPU 11, to display it on a panel, a screen or the like (not shown).

Next, the procedure for communication between the origination facsimile and the opposition facsimile will be described in detail. For transmission of control signals from the origination facsimile 1 to the destination facsimile, the control signals are moved from the CPU 11 to the MODEM 10 via the address/data bus 7 and the MODEAUNCU interface 9. The control signals experience modulation in the MODEM 10 and are output through the NCU 17 over a telephone network to reach the destination facsimile. To receive control signals from the destination facsimile via the telephone network, the control signals are fed into the MODEM 10 via the NCU 17. The control signals undergo demodulation in the MODEM 10 to reach the CPU 11 via the MODEM/NCU interface 9 and the address/data bus 7.

After establishment of a connection between the origination facsimile and the destination facsimile, the MODEM 10, which is provided with functions of V. 8 and V. 34, implements the following four phases prior to the procedure of ITU-T Recommendation T. 30, Fax Handshaking: Phase 1 in V. 8 and Phases 2–4 in V. 34. In the Phases, line conditions are measured and parameters for modulation are determined.

Figure 2:
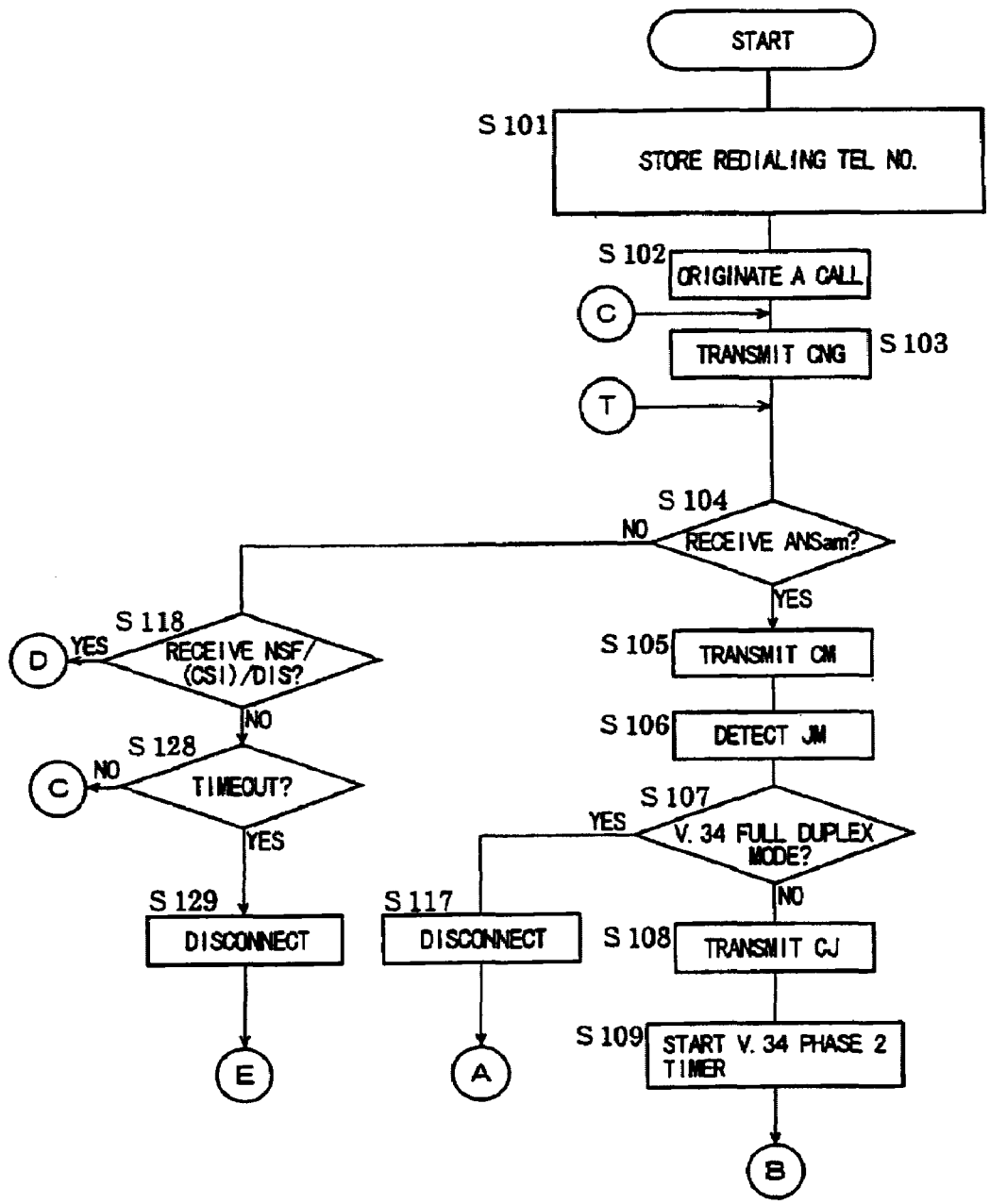
FIGS. 2–4 are flowcharts showing a procedure of processes in the origination facsimile apparatus according to the first embodiment.
Figure 3:
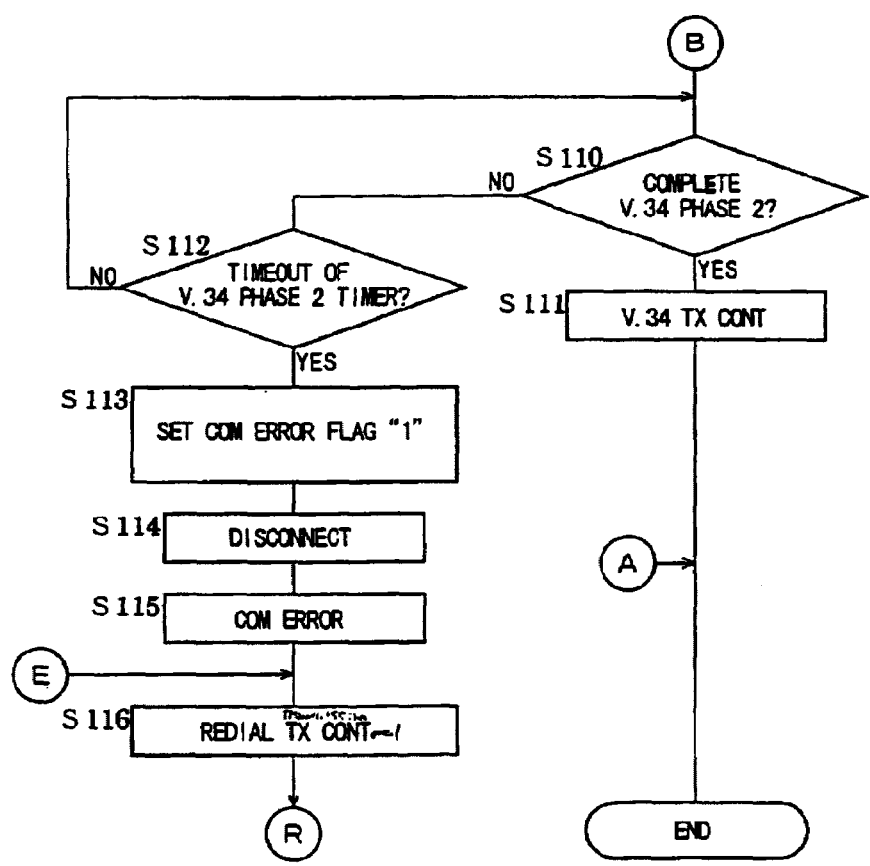
Figure 4:
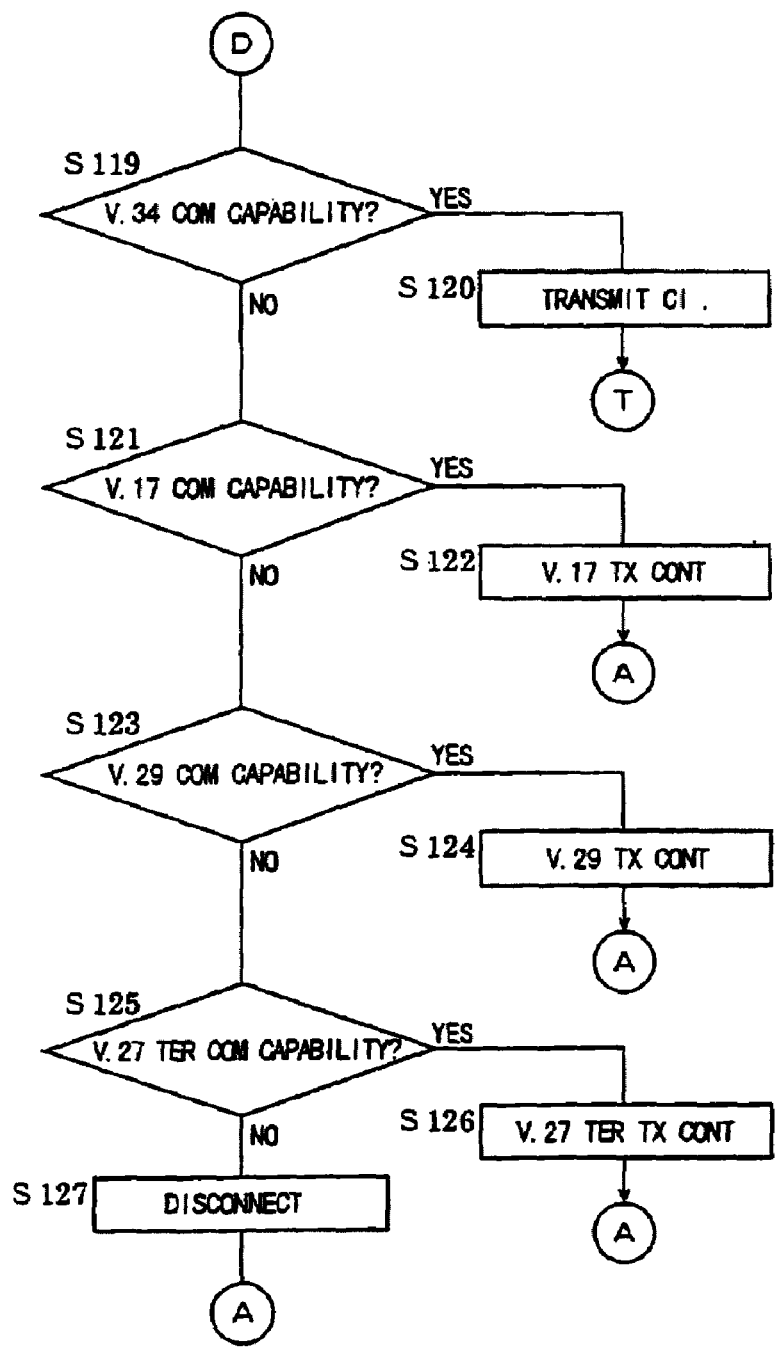

The operation of the origination facsimile 1 in communicating with the destination facsimile in Phase 1 of V. 34 and in Phase 2 of V. 34, win be described referring to FIGS. 2–4.

In FIG. 2, first, the operator inputs the telephone number of the destination facsimile to the operation/display unit 16. The telephone number is forwarded to the CPU II via the interface 14 and the address/data bus 7. In step 101, the CPU 11 stores the telephone number in there dialing telephone number storage area 13a laid in the communication management information storage RAM 13.

The CPU 11 originates a call in step 102, and transmits a CNG signal (Calling tone), whereby the CNG signal is transmitted to the destination facsimile via the telephone network, in step 103. In step 104, the CPU 11 waits for an ANSam signal (Answer tone) from the destination facsimile. Upon receipt of the ANSam signal, the CPU 11 judges whether or not the modem in the destination facsimile is capable of communicating pursuant to V.8. If yes, the procedure advances to step 105, otherwise to step 118.

The CPU 11 transmits to the destination facsimile a CM signal (Can Menu signal) which denotes a modulation mode of the CPU 11, in step 105. Upon receipt of the CM signal, after selecting the same modulation mode as that of the origination facsimile, the destination facsimile returns thereto a JM signal (Joint Menu signal) which is formed in the same format as that of the CM signal. In step 106, the CPU 11 detects the JM signal to confirm which of the modulation modes is selected. In step 107, the CPU 11 judges whether or not the destination facsimile satisfies the full duplex mode of V. 34. If the mode of the destination facsimile is the full duplex mode, the procedure advances to step 117, which disconnects the line to finish the process. Otherwise, the procedure advances to step 108, wherein a CJ signal (Call Joint signal) representing receipt of the JM signal, which is a single octet signal all bits of which are zero, is transmitted to the destination facsimile, in step 108.

The above steps 103–108 constitute Phase 1 of V. 8. After 75 ms (millisecond), the MODEM 10 executes Phase 2 of V. 34. In step 109, the CPU 11 starts the timer in Phase 2 of V. 34.

Referring to FIG. 3, in step 110, once the CPU 11 finishes Phase 2, the procedure advances to step 111, which commences Phase 3 of V. 34.

Phase 2 continues until timeout of the timer, in step 112. If Phase 2 is not completed by timeout of the timer, the procedure advances to step 113. In step 113, the CPU 11 sets "1" the communication error flag bit of V. 34 stored in the communication management information storage RAM 13. The incompleteness of Phase 2 by the timeout is attributed to a poverty of the line condition.

The CPU 11 disconnects the line in step 114, and also carries out a communication error process in step 115. In step 116, the CPU 11 prepares for redialing transmission control, whereby the procedure advances to the redialing transmission control.

Returning to FIG. 2, in the case where the procedure advances from step 104 to step 118, if the CPU 11 detects receipt of the NSF signal (Non-Standard Facilities), the CSI (Called Subscriber Identification) signal, and the DIS (Digital Identification Signal) signal in step 118, the procedure advances to step 119 in FIG. 4. Otherwise, the procedure advances to step 128. Since the CSI signal is an additional signal, it is not always received in step 118. In step 128, the CPU 11 waits for signals from the destination facsimile by repeating steps 103, 104, 118, and 128 by expiration of the preselected time T1.

In step 128, if no signal is received from the destination facsimile by expiration of the time T1, the procedure advances to disconnecting the line at step 129, to reach step 116 in FIG. 3. The advancement of the procedure from step 128 to step 129 in FIG. 2, attributed to a busy line at the destination facsimile.

In step 118, upon receipt of the NSF, CSI, and DIS signals from the destination facsimile, the CPU 11 analyzes those signals for the purpose of examining the communication capability of the destination modem. Then, as shown in FIG. 4 in step 119, if the destination modem is judged to have the communication capability of V. 34, the procedure advances to step 120, in which step the CPU 11 sends a C1 (Call Indicator signal) signal to the destination facsimile, thus allowing the procedure to return to step 104 shown in FIG. 2. Otherwise in step 119, the procedure advances to step 121. In step 121, if the destination modem is judged to have the communication capability of V. 17, the procedure advances to step 122, wherein the CPU 11 prepares for the transmission control pursuant to V. 17, thus completing the procedure. Otherwise, from step 121, the procedure advances to step 123. In step 123, if the destination modem is judged to have the communication capability of V. 29, the procedure advances to step 124, wherein the CPU 11 prepares for the transmission control according to V. 29, thereby completing the procedure. Otherwise, from step 123 the procedure advances to step 125. In step 125, if the destination modem is judged to have the communication capability of V. 27 ter, the procedure advances to step 126, in which step the CPU 11 prepares for the transmission control based upon V. 27 ter to complete the procedure. In step 125, otherwise, from step 125 the procedure advances to step 127, wherein the CPU 11 disconnects the line to finish the procedure.

Next, the process of redialing transmission control which follows the step 116 in FIG. 3 will be described referring to FIGS. 5–7. First, in step 141 in FIG. 5, the CPU 11 reads the telephone number of the destination facsimile out of the redialing telephone number storage area 13a in the communication management information storage RAM 13. In step 142, the CU11 originates are dialing call. In step 143, the CPU 11 transmits a CNG signal, which reaches the destination facsimile via the telephone network. Then, in step 144, the CPU 11 waits for an ANSam signal the destination facsimile. Upon receipt of the ANSam signal, the CPU 11 judges that destination modem is capable of communicating pursuant to V. 8. If yes, the procedure advances to step 145. Otherwise, the procedure advances to step 160.

In step 145, the CPU 11 reads the communication error flag bit of V. 34 out of the communication management information storage RAM 13. In step 146, the CPU 11 examines the communication error flag bit. If the communication error flag bit denotes "1", the procedure advances to step 160; otherwise, to step 147. The processes in steps 147–159 are carried out similarly to those in steps 105–117.

In the event of the advancement of the procedure from step 146 to step 147, communication pursuant to V. 8 and V. 34 is permitted, which arises when the destination facsimile is in the busy state at the first call and is released therefrom at the redialing call.

In the case where the procedure advances from step 144 to step 160, if the CPU 11 receives the NSF signal, CSI, and DIS signals from the destination facsimile in step 160, the procedure advances to step 161; otherwise to step 173. On the other hand, in step 146, if the communication error flag bit represents "1" and the procedure advances to step 160, the destination facsimile automatically sends the NSF, CSI, and DIS signals.

In step 173, the CPU 11 waits for the those signals from the destination facsimile through repetition of steps 143, 144, 160, and 173 by expiration of the predetermined time T1. If the CPU 11 does not receive any signals from the destination facsimile by expiration of the time T1 in step 173, the procedure advances to step 174, at which the CPU 11 disconnects the line, and also prepares for redialing transmission control via step 158, whereby the procedure returns to step 141. The advancement of the procedure from step 173 to step 174 arises when the destination facsimile is in the busy state, for example.

In step 160, upon receipt of the NSF, CSI, DIS signals, the CPU 11 analyzes the signals to judge the communication capability of the destination facsimile. Referring to FIG. 6, in step 161, if the destination facsimile is judged to have the communication capability of V. 34 and the communication error flag bit of V. 34 indicates "0", the procedure advances to step 162, wherein the CPU 11 sends a C1 signal to the destination facsimile, whereby the procedure returns to step 144 in FIG. 5. Otherwise, from step 161 the procedure advances to step 163. In step 163, if the destination modem is judged to have the communication capability of V. 17, the CPU 11 sets to "0" the communication error flag bit of V. 17 and stores it in the communication management information storage RAM 13. Subsequently, the procedure advances to step 165, in which step the CPU 11 prepares for transmission control pursuant to V. 17, that is, changes the transmission mode of the MODEM 10 so as to be suitable for the transmission control of V. 17, thereby completing the procedure.

However, if in step 163, the destination modem is judged not to have the communication capability of V. 17, the procedure advances to step 166. In step 166, if the destination modem is judged to have the communication capability of the recommendation V. 29, the procedure advances to step 167, wherein the CPU 11 sets to "0" the communication error flag bit of V. 34 to store it in the communication management information storage RAM 13. Thereafter, the procedure advances to step 168, wherein the CPU 11 prepares for transmission control according to V. 29 to complete the procedure.

Otherwise, from step 166 the procedure advances to step 169. In step 169, if the destination facsimile is judged to have the communication capability of V. 27 ter, the procedure advances to step 170, in which step the CPU 11 sets to "0" the communication error flag bit of V. 34, thus storing it in the communication management storage RAM 13. Subsequently, the procedure advances to step 171, whereby the CPU 11 prepares for transmission control based upon V. 27 ter to complete the procedure.

In step 169, of the destination facsimile is judged not to have the communication capability to V. 27 ter, the procedure advances to step 172, wherein the CPU 11 sets to "0" the communication error flag bit of V. 34 to store it in the communication management information storage RAM 13. Then, the procedure advances to step 159, in which the CPU 11 disconnects the line to complete the procedure.

In the above procedure referring back to FIG. 4, the communication capabilities of the V. 17, V. 29, and V. 27 ter are lower in the order thereof. Accordingly, the sequence of the steps 121, 123, and 125 for examination of the communication capability of the destination facsimile enables a transmission control suitable for the line condition to be selected as quickly as possible.

Figure 5:
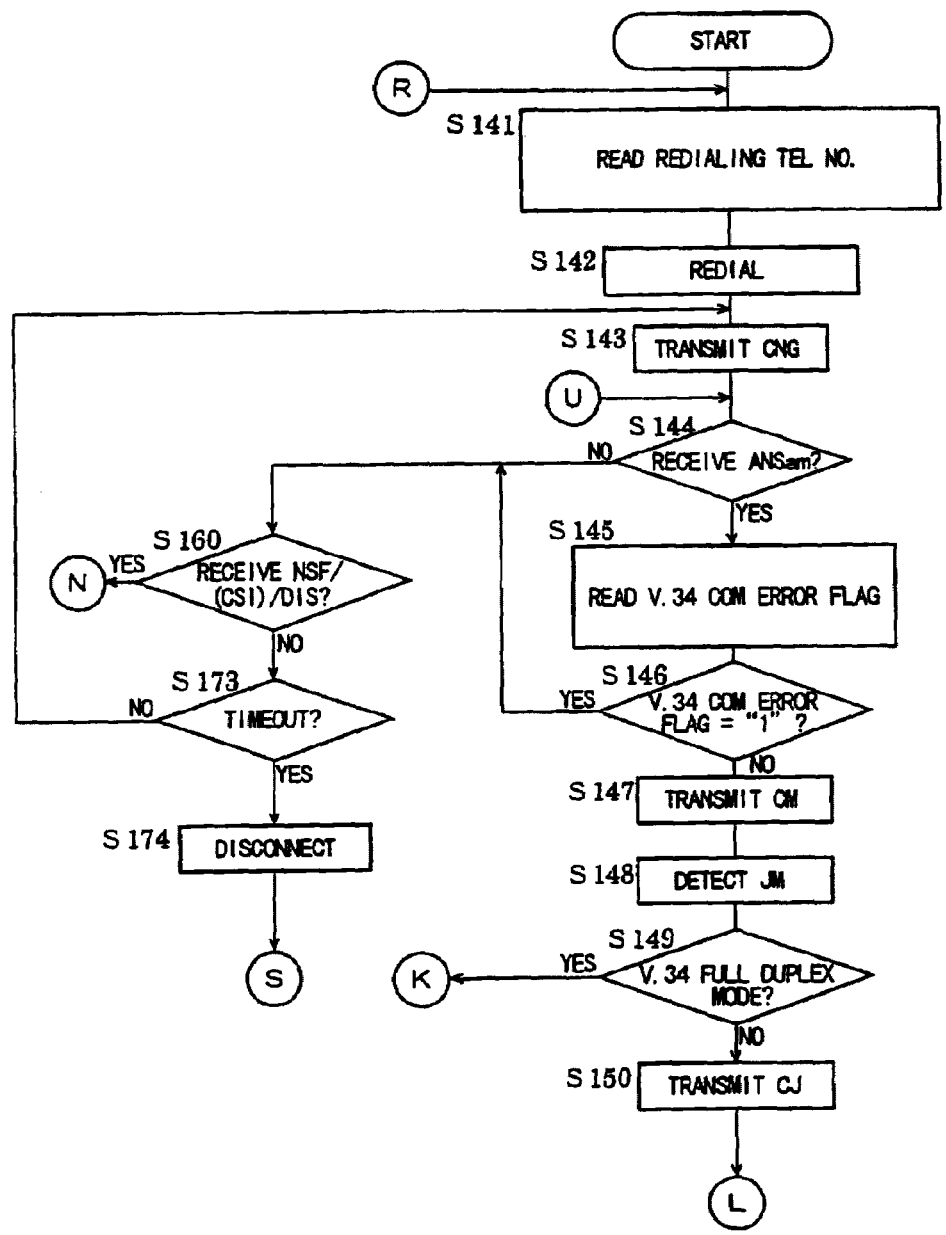
FIGS. 5–7 are flowcharts showing a procedure for performing processes of redialing according to a first embodiment.

In step 116 (FIG. 3), when the procedure advances to the redialing transmission control, the procedure depicted in FIG. 5 automatically starts, which commences a redialing origination process. Such a transmission procedure depends upon neither the feeder transmission nor the memory transmission. That is to say, concerning the feeder transmission, if the document to be transmitted is not scanned, restarting transmission of the document from the first page thereof is attained by redialing and scanning the document. Regarding the memory transmission, restarting transmission of all of the document is automatically accomplished.

As described in the foregoing, according to V. 34, the origination and destination modems carry out training therebetween independently of the CPU 11 to execute an original negotiation for determining a data rate for facsimile transmission. If the negotiation fails and the line is disconnected due to a communication error, the communication management information storage RAM 13 stores the communication management information in order to clarify the cause of the communication error for determining a transmission control after redialing. After a subsequent redialing, the CPU 11 eliminates the negotiation peculiar to the modems pursuant to V. 34. Alternatively, the CPU 11 performs another negotiation for controlling the modems, thus selecting one among the transmission modes which corresponding to V. 17, V. 29, and V. 27 ter, on the basis of the communication capability of the destination facsimile.

As described above, the facsimile apparatus according to the first embodiment can avoid repetition of a communication error produced by executing the negotiation peculiar to the modems after redialing. Moreover, even though the line condition after redialing does not enable a communication pursuant to V. 34, a communication pursuant to other Recommendations, or other transmission modes can be attained.

Thereby, concerning a destination facsimile provided with a modem capable of communicating pursuant to V. 34, if a communication error arises due to a bad line condition, the origination facsimile stores a communication error flag indicative of a failure in setting pursuant to V. 34. Upon redialing, the origination facsimile implements the transmission control based upon a transmission mode other than V. 34 in order to correspond to the communication capability of the destination facsimile. This enables the origination facsimile and the destination facsimile to communicate with each other, even though the line condition therebetween does not permit the communication pursuant to V. 34.

In addition, the procedure of examining the communication capability of the destination facsimile advances in the order from a high transmission rate to a low transmission rate. This enables a quick selection of a higher transmission mode among several transmission modes which is suited for the existent line condition.

The above origination facsimile apparatus redials upon the occurrence of a failure in communicating at a first transmission rate through a first or initial line, that is, upon the occurrence of a communication error that the first line is not suitable for the first transmission rate. Specifically, the origination facsimile apparatus, when the line is not suited for the first transmission rate, disconnects the first line and establishes a second or next line, thus trying communication at the second transmission rate through the second line.

In contrast, the origination facsimile apparatus may try communication at the second transmission rate with neither disconnecting the first line nor establishing the second line.

In other words, the origination facsimile apparatus may try communication at the second transmission rate by using the same first line. The operation of such an origination facsimile apparatus will be explained. First, the modem 10 establishes a first or initial line between the origination facsimile apparatus 1 and the destination facsimile apparatus. Next, the modem 10 attempts through the first line, a first communication at a first transmission rate specified by the performance of both the origination facsimile apparatus 1 and the destination facsimile apparatus. Once the trial of the first communication at the first transmission rate though the first line has failed, the RAM 13 stores therein information on the failure. Thereafter, the CPU 11 forces the modem 10 to attempt through the same first line, a second communication at a second transmission rate that is lower than the first transmission rate, referring to the information on the failure of the first communication at the first transmission rate that has been stored in the RAM 13 upon occurrence thereof. Similarly to the above embodiment, this enables those facsimile apparatuses to communicate with each other possibly earlier and at a higher transmission rate then might otherwise be possible.

The stored information preferably includes data other than the above-mentioned flag. For example, if upon the occurrence of the failure, the RAM 13 stores therein a first transmission rate at which the first communication has failed, the CPU 11 can readily force the modem 10 to try a second transmission rate that is lower than the first transmission rate and that is nearest to the first transmission rate among other rates at which the apparatuses can communicate, referring to the information on the first transmission rate stored in the RAM 13. In addition, if the trial at the second transmission rate fails and the RAM 13 further stores therein the second transmission rate, the CPU 11 can readily force the modem 10 to attempt a communication at a third transmission rate that is lower than the second transmission rate and that is closest to the second transmission rate. Such a stepwise trial enables the facsimile apparatuses to communicate at possible higher transmission rate without wasteful trial.

Second Embodiment

As described above, the first embodiment selects the optimum transmission mode in redialing, when there arises a communication error in line-probing by the modems. However, there might occur a communication error after commencement of communication. More specifically, after establishment of negotiation peculiar to the modems and commencement of communication, the line might be disconnected due a communication error. In this case, employing the same control as that of the first embodiment over failure in establishment of negotiation, can avoid repetition of a communication error.

Figure 8:
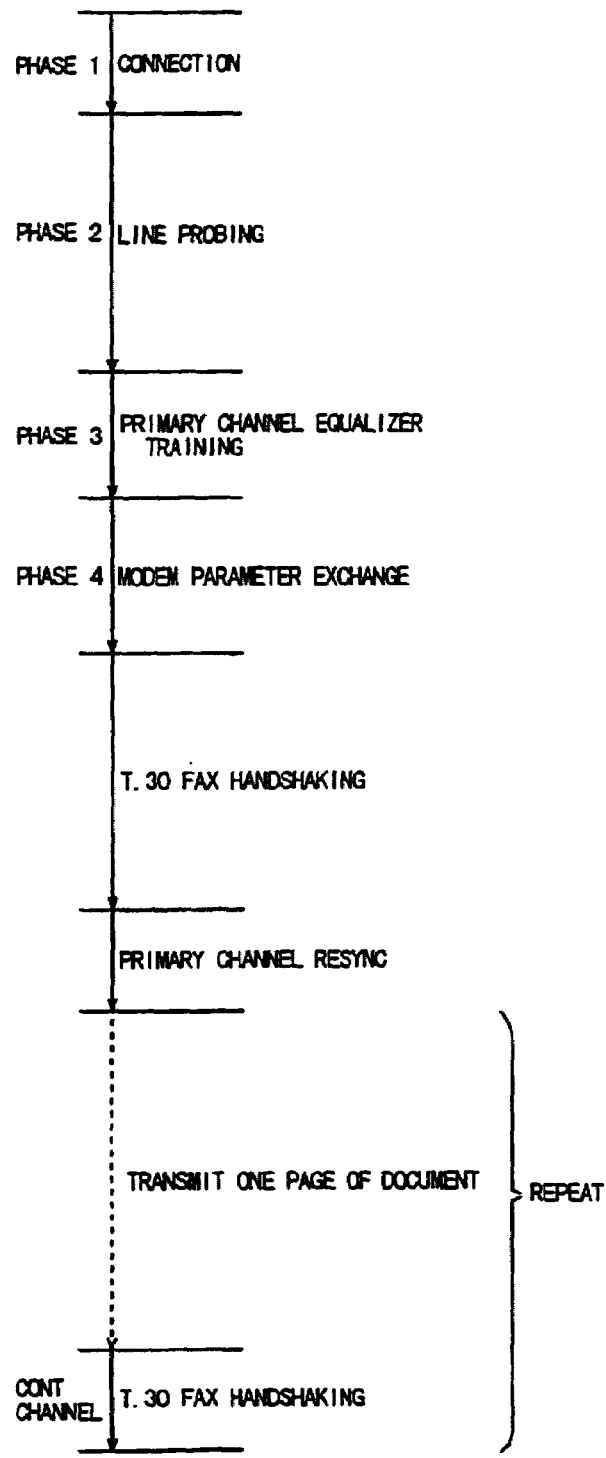
FIG. 8 is a sequence chart showing a communication for performing the facsimile apparatus according to the first embodiment.

FIG. 8 shows a communication sequence of the facsimile apparatus according to the second embodiment. In FIG. 8, the communication procedure of the facsimile apparatus is roughly similar to that of a conventional facsimile. Therefore, the feature of the second embodiment will be described in detail below.

First, after origination of a call, a line is established in Phase 1. In Phase 2, the line-probing is carried out, and training in the primary channel follows in Phase 3. In Phase 4, the parameters for modulation are exchanged. Subsequently, the Fax Handshaking of T. 30 is executed. Upon completion of exchanging, facsimile transmission of the first page of the document to be transmitted starts.

The transmission of the first page is performed using the primary channel. After completion of the first page transmission, the Fax Handshaking of T. 30 is executed again, which is referred to as the control channel. For transmission of a plurality of pages of the document, the control channel is given for each page transmission. The Fax Handshaking of T. 30 in the control channel is carried out at a transmission rate of 2400 bps or 1200 bps, which is less reliable than other transmission modes using a transmission rate of 300 bps, for example, in V. 17 and V. 29. In the control channel, the modems execute the original negotiation by themselves that is independently of the CPU 11. If a failure to establish of the negotiation, retraining is carried out. Further, unless the retraining succeeds, a communication error occurs, which poses the same problem as in the first embodiment.

Incidentally, redialing after commencement of communication requires retransmission of all the images of the document. Therefore, applying the memory transmission is preferable, which has stored in an image memory all of the image information of the document in advance. The image information is stored in the communication buffer RAM 8 in FIG. 1. More specifically, the image information scanned by the scanner 2 in FIG. 1 passes through the reading unit 5a to be stored in the line memory 4 temporarily.

Thereafter, corresponding to a data compression mode of the image information compressing/expanding unit 6, the image information is read out of the line memory 4, to be compressed. The data is stored in the communication buffer RAM 8 through the address/data bus 7. Upon completion of storing the whole image information of the document into the communication buffer RAM 8, the image information is sequentially read out for transmission. Except for the above, the configuration and function of the facsimile apparatus according to the second embodiment is similar to the first embodiment.

Figure 9:
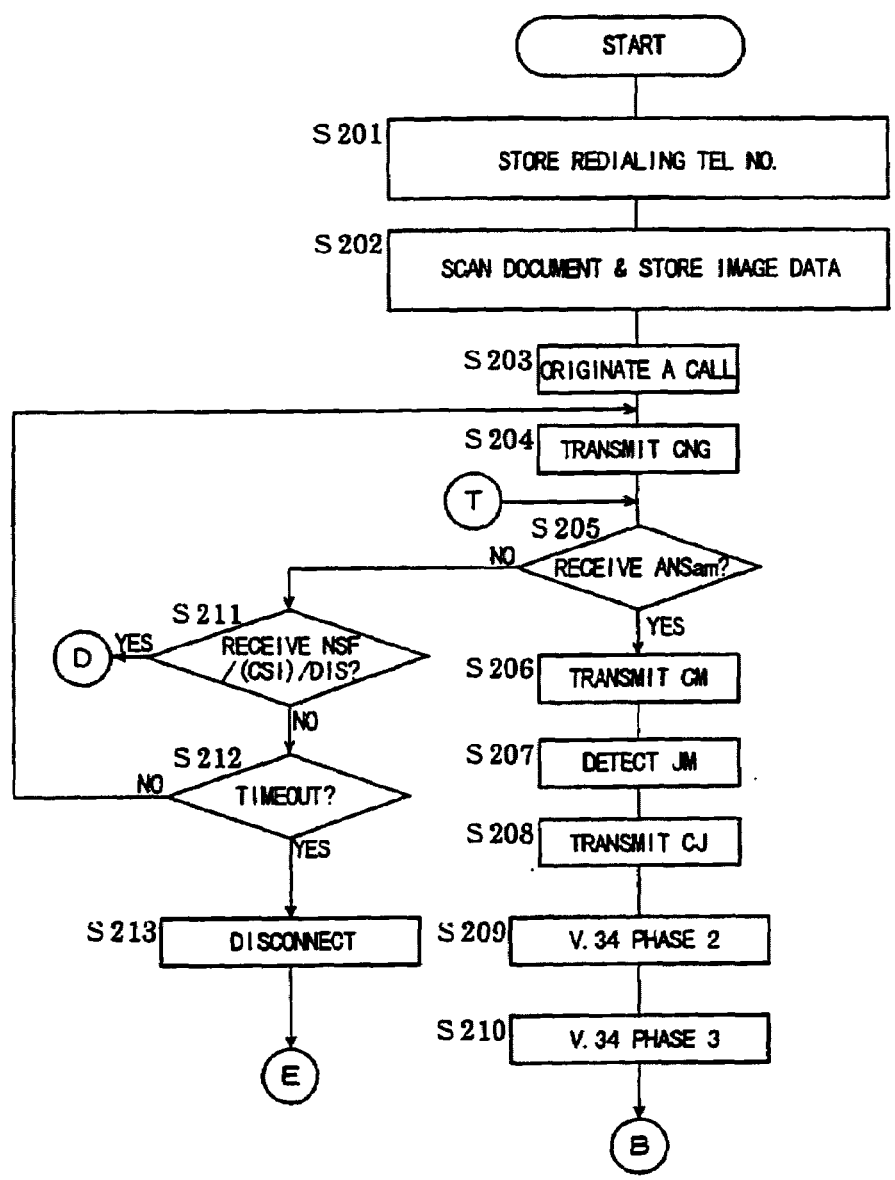
Figure 10:
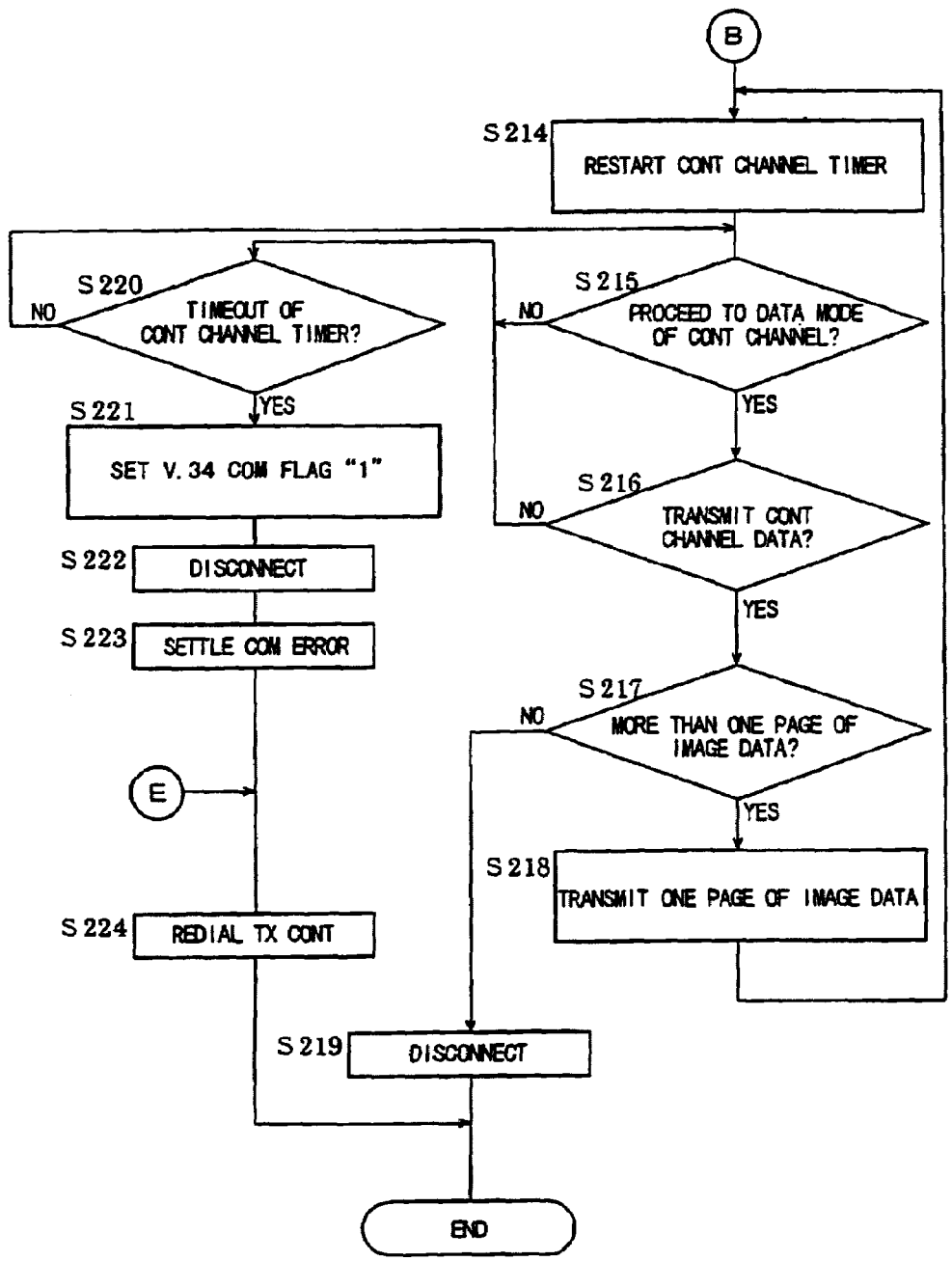
FIGS. 10 and 11 are flowcharts showing a procedure for performing processes in the origination facsimile apparatus according to a second embodiment.

Hereinafter, the function of the facsimile of the second embodiment will be described. FIGS. 9 and 10 are flowcharts showing the operational procedure of the origination facsimile according to the second embodiment.

First, the operator, who intends to send a document 2A, inputs a telephone number to the operation/display unit 16, whereupon the CPU 11 recognizes it with the interface 14. In step 201, the CPU 11 stores the telephone number in the redialing number storage area 13a of the communication management information storage RAM 13, for use in redialing. Subsequently, in step 202, the CPU 11 reads the transmission document 2A using the scanner 2. The read image is stored in the communication buffer RAM 8 through the reading unit 5a, the line memory 4, and the image information compressing/expanding unit 6.

Next, in step 203, the CPU 11 originates a call. Thereafter, in step 204, the CPU 11 sends a CNG signal and also waits for an ANSam signal, in step 205. Upon receipt of the ANSam signal, the CPU 11 judges that the destination modem is capable of communicating pursuant to V. 8. If yes, the procedure advances to step 206; otherwise, to step 211.

In step 206, the CPU 11 transmits to the destination facsimile a CM signal indicative of the modulation mode of the origination facsimile. The destination facsimile sends to the origination facsimile a JM signal representing which of the modulation modes of the origination facsimile is applied. The CPU 11 detects the JM signal in step 207. Subsequently, the CPU 11 sends a CJ signal in step 208. Further, the MODEM 10 starts the process of Phase 2 of V. 34.

In Phase 2 of V. 34, the origination and destination modems exchange modulation options, measure the line condition using a line-probing signal, and exchange a symbol rate, information as to whether there is a pre-emphasis or not, an available data rate, a carrier frequency, and information on transmission level of each facsimile. Thereafter, the procedure advances to step 210.

In step 210, the MODEM 10 carries out Phase 3 of V. 34, wherein training of an equalizer and an echo chancellor is performed on the basis of the symbol rate and the carrier frequency. Further, the procedure advances to step 214 shown in FIG. 10.

Referring to FIG. 10, in step 214, the MODEM 10 starts the operation in the control channel. The MODEM 10 exchanges the parameters on modulation used for communication and carries out training, thus determining the data rate for communication. Upon commencement of the process in step 214, the CPU 11 activates the timer for the control channel. In step 215, the CPU 11 confirms whether or not the MODEM 10 completes the exchange of parameters and training, to proceed to a data mode. Proceeding to the data mode allows the procedure to advance to step 216.

In step 216, the CPU 11 transmits and receives signals to/from the destination facsimile pursuant T. 30, completion of which permits the procedure to advance to step 217. Herein, the CPU 11 judges whether or not there remains in the memory, more than one page of image data to be transmitted. If it remains, the procedure advances to step 218, wherein the CPU 11 transmits to the destination facsimile, one page of image data as the primary channel data.

Upon completion of transmitting, the procedure returns to step 214 and steps 214–218 are repeated, whereby all of the pages are transmitted. After completion of transmission of all the pages, the procedure advances from step 217 to step 219, which disconnects the line.

The control channel is given whenever each page is transmitted; upon commencement of preparing the control channel, the timer therefor starts, in step 214. In the case where the data mode of the control channel does not start by timeout of the timer in step 215, or transmission and receipt of data for the control channel is not completed in step 216, the procedure advances to step 220 on assumption that trouble has arisen.

In step 221, the communication error flag of V. 34 in the communication management information storage RAM 13 is set to "1" to be stored. The communication error flag denotes that a communication error has or has not arisen during the original negotiation by the modems in the control channel. The occurrence of such a communication error can be attributed to deterioration of the line condition after commencement of communication, for example. In step 222, the line is disconnected, and the communication error is settled in step 223, which allows the procedure to advance to step 224 for redialing transmission control.

Returning to FIG. 9, in step 205, if the ANSam signal is not received, the procedure advances to step 211. The processes following after step 211 are identical with those in the explanation of FIG. 2. Steps 211, 212, and 213 in FIG. 9 correspond to steps 118, 128, and 129 in FIG. 2, respectively. If yes in step 211, the process shown in FIG. 4 is executed. Upon completion of the process in step 120 shown in FIG. 4, the procedure advance to step 205 shown in FIG. 9. Other processes are implemented as shown FIG. 4.

Figure 6:
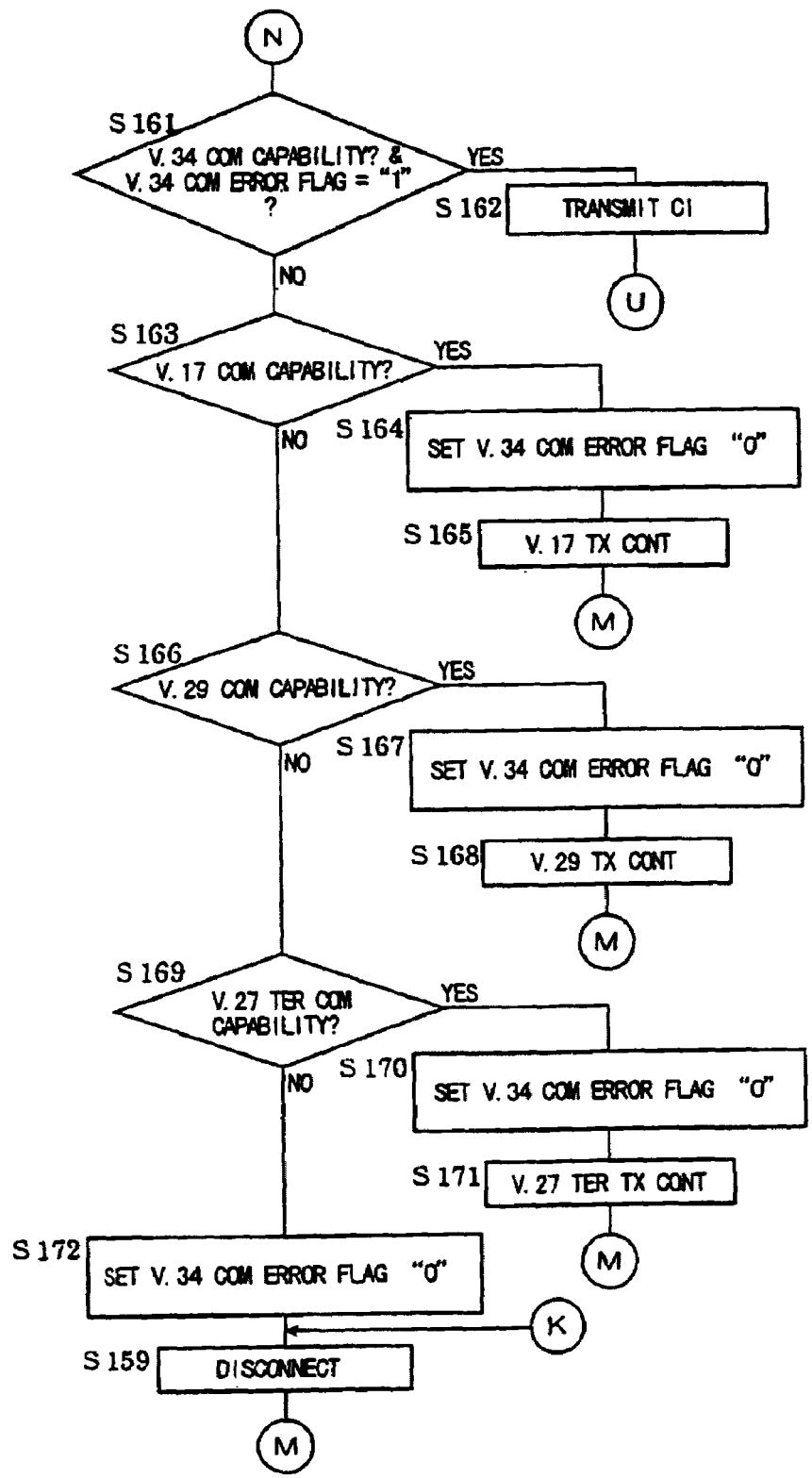
Figure 7:
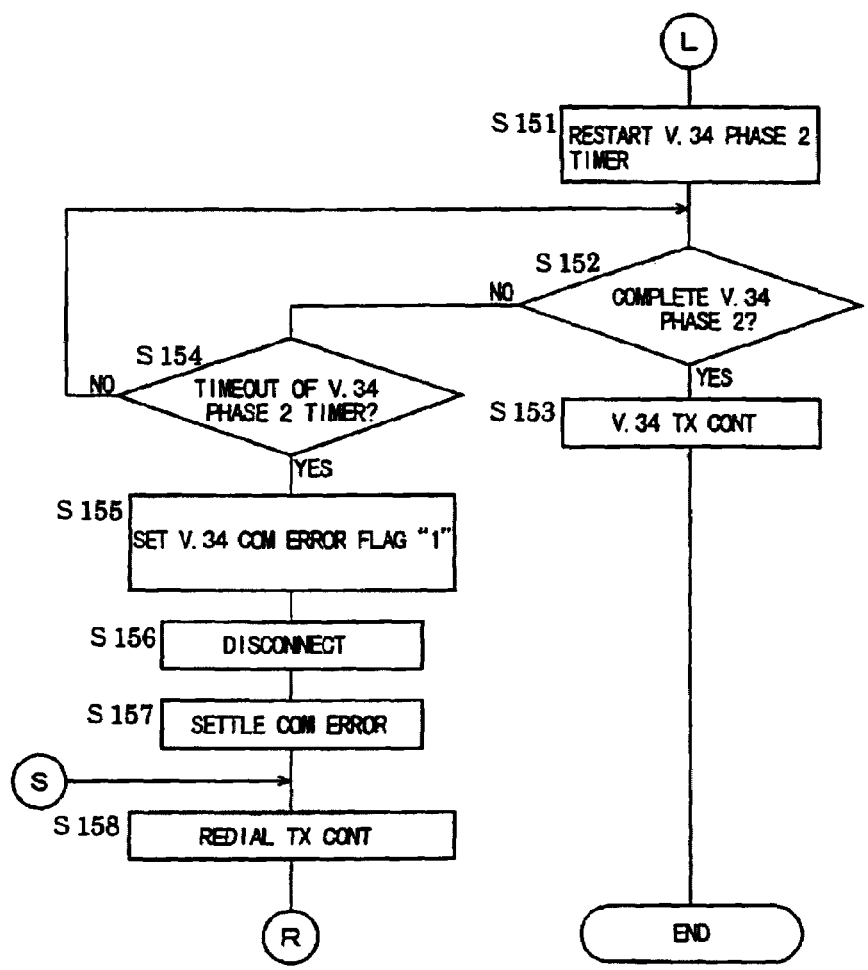

The redialing transmission control in step 224 shown in FIG. 10 is substantially identical with the processes of the first embodiment shown in FIGS. 5–7. More specifically, the redialing process is carried out by reading the telephone number of the destination facsimile out of the redialing telephone number storage area 13a. The communication error flag is then read out. If the flag denotes "1", the processes in step 163 and the following steps shown in FIG. 6, expel the negotiation inherent in the modems, but alternatively the negotiation under control of the CPU 11 is implemented.

After determination of the transmission mode in this way, image data on the transmission document stored in the communication buffer RAM 8 is read out, whereby all the image information is transmitted pursuant to V. 17, V. 29, or V. 27 ter.

As described above, in the case where after commencement of the facsimile transmission the modems implement the original negotiation in the control channel, yet a communication error arises, employing the same control as in the first embodiment can prevent repetition of communication error even though the line condition becomes deteriorated.

To automatically redial when a communication error occurs after commencement of the transmission, it is preferable to have stored in advance the image data on the document, which enables a facsimile transmission thereof to start with no assistance from the operator after redialing.

Third Embodiment

There might arise a failure in reconnection despite redialing. In this case, canceling the redialing process or storing no contents of the image makes it possible to prevent a useless redialing process and to efficiently use the image memory. The failure in reconnection or the repetition of communication error is sometimes caused by the destination facsimile, in particular its inability to reconnect. Unexpected causes also frequently forces the operator to disconnect the line. Provided a judgment is made on which should be implemented, a prompt redialing or redialing after waiting during a given time of period, according to the cause of the communication error, setting a waiting time based upon the judgment can prevent ineffective redialing and repetition of communication error. Similarly, setting the number of times to repeat the redialing, according to the cause of the communication error, can prevent useless redialing and repetition of communication error. The reason is that accomplishment of reconnection through repetition of redialing depends upon causes of communication errors.

Preferably, the communication management information storage stores information indicative of the cause of the communication error, by completion of the redialing control based upon the communication error, and the information is available to the CPU 11. The redialing control based upon the communication error is finished upon completion of the communication after reconnection through the redialing process or upon cancellation of the redialing process.

A third embodiment, configured from the above viewpoint, will be described below. In the third embodiment, the communication management information storage RAM 13 stores a variety of parameters shown in FIG. 11. The communication management information storage RAM 13 incorporates the error code storage unit 21, the redialing number storage unit 22, the redialing interval storage unit 23, the redialing permission indication unit 24, and the redialing result storage unit 25.

The error code storage unit 21 stores error codes, details of which will be described later, to indicate types of errors. The redialing number storage unit 22 stores the permissible number of redials after a communication error. The number of times to redial is defaulted upon initialization of the facsimile or is set to an arbitrary value by the operator. In this embodiment, the CPU 11 decides the number of times according to the result of the communication.

The redialing interval storage unit 23 stores an instruction on the interval between redials in the event of failure in redialing due to a busy signal or the like. The instruction is also changed by the CPU 11 according to the result of the communication. The redialing permission indication unit 24 stores an indication data representing whether the redialing is permitted or not, and for example, redialing is inhibited upon judgment that the redialing is ineffective.

The communication result storage unit 25 stores information representing either a normal completion when the communication is normally completed or an error type when a communication error arises. In addition, there is stored information indicating the telephone number of the destination facsimile, the resolution of the transmission document, a compression method, an error correction function, and a transmission rate. The information serves to investigate the cause of a communication error, and to determine the permissible number of redials and the intervals therebetween upon occurrence of a communication error.

Figure 11:
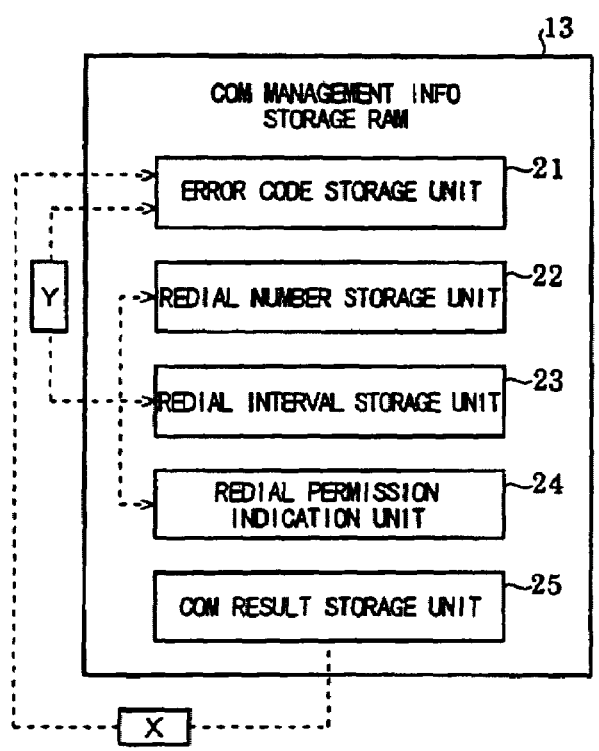

In FIG. 11, the dotted arrows depict the processes executed by the CPU 11 using various parameters stored in the communication management information storage RAM 13. More specifically, the error code preparation process X prepares error codes based upon the communication result stored in the communication result storage unit 25, wherein the error codes are stored in the error code storage unit 21. In the redialing determination process Y, the CPU 11 determines the permissible number of redials, the interval between redials, and the permission or inhibition of redialing, based upon the error codes stored in a error code storage unit 21, each of which is stored in the respective one of the redialing number storage unit 22, the redialing interval storage unit 23, and the redialing permission indication unit 24.

FIG. 12 is an explanatory diagram showing the error code preparation process X and the redialing determination process Y. In FIG. 12, four columns are referred as to respectively the first column, the second column, the third column, and the fourth column, from left to right. The first column denotes status that no communication has been established; the second column denotes a factors representative of the status; the third column denotes error codes; and the fourth column denotes permission or inhibition of redialing, the interval thereof, and the number permissible thereof. The CPU 11 recognizes each status in the first column based upon the factors in the second column to prepare the error codes in the third column. On the basis of the prepared error codes, the CPU 11 determines to permit or inhibit redialing, the interval thereof, and the permissible number thereof, in the fourth column.

Hereinafter, examples of the error codes preparation process and the redialing determination process will be described in detail. First, assuming that the destination facsimile is in the busy state, upon detection of a busy tone, the error code is set to "1111", which allows information denoting permission of redialing to be stored in the redialing permission indication unit 24, and permits the interval of redialing and the permissible number of times thereof to remains unchanged.

Next, it is assumed that several errors continuously arise to disconnect the communication. These errors are deemed to be due to a poor line condition, for example. In this case, the CPU 11 sends a post command for investigating the cause of the errors, whereby a RTN signal is received to set the error code to "3210." Since a quick recovery of the line from the bad condition appears unlikely, the CPU 11 preferably lengthens the interval of redialing. Hence, the interval of redialing is set to five minutes, for example. In addition, the CPU 11 sets the number of times to redial at three times, because failures in connection over ten or fifteen minute imply that a quick recovery of the line is unlikely.

Next, it is assumed that a communication error arises owing to an error which has occurred during training, in spite of the minimum transmission rate, 2400 bps This does not permit a further FTT fall-back function to be performed. However, the error code is set to "2345", which allows a prompt trial of reconnection. Moreover, the interval of redialing is set at a minimum, e.g., three minute. The number of times of redialing is set to five times, because fifteen or twenty minutes is deemed to be enough to establish a communication.

Further, it is assumed that the destination facsimile cannot continue to receive due to a jamming or absence of paper, or that operation of the destination facsimile has been halted owing to a power failure while receiving. These accidents are recognized based upon a failure to receive a reply in response to three successive post commands, the error code of which is assigned as "3111." In this case, judging from time for the setting of papers or the recovery of the power, prompt redialing is deemed useless. Accordingly, the interval of redialing is set to be a rather long period of time, e.g., fifteen minute. In addition, in spite of redialing at such intervals, causes other than the above might not allow the line to be reestablished. Therefore, to prevent useless redialing, the number of times of redialing is set to be two.

Further, it is assumed that the origination facsimile is halted due to a power failure during transmission. The assigned error code is "3500." In this case, since a recovery of the power quickly enables a restart of the transmission, the interval of redialing is preferably set to be short and also the permissible number of redials can be set without limit.

Next, it is assumed that the destination facsimile, has been turned off, and therefore does not reply, or that a telephone returns a voice in lieu of the destination facsimile. Such incidents are recognized once there occurs a timeout of a waiting time for a connection of the line. The error code is set to "12AA." Since the destination facsimile never replies to the redialing, the redialing is set to be inhibited.

Next, it is assumed that the transmission by the origination facsimile is canceled or stopped by the operator using a stop key or a cancel key during transmission. Such an incident is recognized by detecting depression of a key. The error codes in such cases are assigned to be "1001" and "3A00", respectively. The pressing key can be attributed to unexpected circumstances concerning the operator; therefore, redialing is set to be inhibited in order to avoid an ineffective redialing.

Finally, it is assumed that the destination facsimile is not available for the confidential transmission or the transference transmission. Such circumstances are indicated, for example, by using the NSF signal. The error codes for such circumstances are assigned "5678" and "5679", respectively. Since redialing is deemed useless, redialing is set to be inhibited.

For the format of the error codes, any arbitrary combinations of numbers and signs are available. Since there exist a number of error statuses relating to the origination facsimile and the destination facsimile, it is preferable to employ a three-digit number or a four-digit number according to hexadecimal notation, for example. To easily distinguish errors from each other, it is preferable, for example, to allocate "1" to the top figure of the number so as to represent an error which occurs prior to establishment of the line, and to allocate "2" to it so as to represent an error which occurs in Phase B of the facsimile transmission. In place of being set by the CPU 11, the interval of redialing and the number of redials may be manually set by the operator, referring to the error code list or the like.

Hereinafter, the operation of the facsimile according to the third embodiment will be described with reference to FIG. 13. The explanation will proceed on the assumption that the origination facsimile has already originated a call and begun to send the transmission document after completion of a negotiation, prior to commencement of the operation shown in FIG. 13.

First, assuming that a communication error arises in step 301, storage of the image data on the transmission document remains unchanged in step 302. More differing from common facsimiles that automatically delete the stored image data upon disconnection of the line, the communication buffer RAM 8 continues to secure the whole image data that has been scanned in advance for transmission. In step 303, if there occurs a communication error, the communication result storage unit 25 stores the status corresponding thereto. The CPU 11 prepares an error code on the basis of the communication result as explained above, and stores it in the error code storage unit 21.

Subsequently, based upon the error code, the CPU 11 stores in the redialing permission display unit 24, information indicative of permission/inhibition of redialing, that is to say, whether redialing is permitted or inhibited, in step 305. In step 306, referring to the stored information, the CPU 11 judges the necessity of redialing.

If redialing is deemed necessary, the procedure advances to step 307, wherein the interval of redialing and the number of redials are determined, and respectively stored in the redialing number storage unit 22 and the redialing storage unit 23.

In step 308, the timer for redialing is set to a given time, and waiting for timeout thereof continues. Upon occurrence of the timeout, the procedure advances to step 310 for redialing. As in and as above with respect to discussed the first and second embodiments, a negotiation is carried out under control of the CPU 11 and a communication at a given transmission rate is implemented. Thereafter, communication is monitored to finish regularly or not in step 311.

If the communication is regularly completed, the procedure terminated completely. Otherwise, the procedure advances to step 312, at which an error code of the communication us produced. Then, in step 313, the previous error code and this new error code are compared. If identical, the procedure advances to step 314, at which the permissible number of further redials is reduced by one and the reduced number stored in the redial number storage unit 22. Then, the procedure advances to step 315, where the stored number of redials is judged to be larger than zero or not. If larger, the procedure returns to step 308, which repeats the redialing. Otherwise, the procedure advances to step 316 with no more redialing permitted. In step 316, the stored image data is erased from the communication buffer RAM 8 so as to allow it to be available for other communication, which enables efficient use thereof. Thereafter, in step 317, the communication error is indicated in the operation/display unit 16, which notifies the operator that there will be no more redialing, so as to request the operator to manage the communication error. If different in step 313, the procedure returns to step 302, at which processes are executed for the new communication error.

Any new communication error is accompanied by step 307 where the number of times of redials is determined. Therefore, if communication errors occur frequently, the number of times of redialing is set for each of the new communication errors repeatedly, thereby not allowing the procedure to be completed. Accordingly, in lieu of returning to step 302 followed by step 307, proceeding to step 316 that indicates communication errors may be applied to step 313. Alternatively, it may be employed to set an upper limit to the number of times of redialing the procedure to step 316 regardless of the error codes, once the number of dials that have been executed reaches the upper limit.

As described above, upon the occurrence of a communication error, the communication management information indicative of a cause of the communication error is collected. If, based upon the communication management information, the establishment of a reconnection is judged possible, the image data stored in the communication buffer RAM 8 continues to be stored. After redialing, once a connection at another transmission rate is established, the image data stored in the communication buffer RAM 8 is transmitted.

Further, setting the waiting time up to redialing and setting the number of times of redialing can eliminate repetition of useless redialing. In addition, the communication management information storage RAM 8 stores information indicative of the cause of a communication error by completion of the redialing control, and the CPU 11 refers to the stored information, which can provide optimum redialing control against the communication error.

While the present invention has been disclosed in terms of preferred embodiments in order to facilitate a better understanding thereof, it should be appreciated that the invention can be embodied in various ways without departing from the principle of the invention. Therefore, the invention should be understood to include all possible embodiments and modifications of the shown embodiments which can be embodied without departing from the principle of the invention, as set forth in the appended claims.

What is claimed is:

1. A facsimile apparatus that establishes a line to a destination facsimile apparatus and communicates therewith through the line, comprising:
   a modem that establishes a first line to the destination facsimile apparatus and attempts a communication at a first transmission rate through the first line,
   a controller that, upon a failure of the communication at the first transmission rate due to a bad condition on the first line, prevents the modem from attempting the communication at the first transmission rate and forces the modem to attempt a communication at a second transmission rate lower than the first transmission rate, and
   a storage that, upon the failure the first communication attempted by modem, stores therein information on the failure,
   wherein the controller judges failure of the first communication attempted by modem, based upon the information stored in the storage, and forces the modem to try the second communication.

2. A facsimile apparatus as set forth in claim 1, wherein the modem sets the first transmission rate according to the performance of the facsimile apparatus and that of the destination facsimile apparatus.

3. A facsimile apparatus as set forth in claim 2, wherein the modem sets the first transmission rate at the maximum transmission rate at which the facsimile apparatus and the destination facsimile apparatus are capable of communicating with each other.

4. A facsimile apparatus as set forth in claim 2, wherein the modem implements a negotiation with the destination facsimile apparatus, to acquire the performance of the destination facsimile apparatus.

5. A facsimile apparatus that establishes a line to a destination facsimile apparatus and communicates therewith through the line, comprising:
   a modem that establishes a first line to the destination facsimile apparatus and attempts a communication at a first transmission rate through the first line, and
   a controller that, upon a failure of the first communication due to a bad condition on the first line, discontinues attempting the first communication at the first transmission rate and controls modem to attempt a second communication, wherein
   the controller controls the modem to disconnect the first line and establishes a second line to the destination facsimile apparatus, upon the failure of the first communication and forces the modem to attempt the second communication through the second line, upon the establishment of the second line.

6. A facsimile apparatus as set forth in claim 5, wherein the modem sets the first transmission rate according to the performance of the facsimile apparatus and that of the destination facsimile apparatus.

7. A facsimile apparatus as set forth in claim 6, wherein the modem sets the first transmission rate at the maximum transmission rate at which the facsimile apparatus and the destination facsimile apparatus are capable of communicating with each other.

8. A facsimile apparatus as set forth in claim 6, wherein the modem implements a negotiation with the destination facsimile apparatus, to acquire the performance of the destination facsimile apparatus.

9. A facsimile apparatus comprising:
   a modem that
      establishes a first line to a destination facsimile apparatus,
      sets a first transmission rate to be the maximum transmission rate at which the facsimile apparatus and the destination facsimile apparatus are capable of communicating with each other, according to the performance of the facsimile apparatus and that of the destination facsimile apparatus,
      attempts a first communication at the first transmission rate through the first line, and
      upon a failure of the first communication through the first line due to a bad condition of the first line, disconnects the first line, and then establishes a second line to the destination facsimile apparatus after disconnecting the first line;
   a storage that
      stores therein, upon a failure of the first communication, information on the failure; and
   a controller that,
      upon establishment of the second line, judges whether the attempt of the first communication through the first line has succeeded or failed, based upon the information stored in the storage, and
      upon judging that the attempt of the first communication has failed, prevents the modem from attempting the first communication through the first line, and forces the modem to attempt through the second line, a second communication at a second transmission rate that is lower than the first transmission rate and that is closest thereto among transmission rates that the facsimile apparatus and the destination apparatus are capable of communicating with each other.

10. A facsimile apparatus as set forth in claim 9, wherein the modem decides the first transmission rate using an ANSam signal defined by V.34 of ITU-T Recommendation.

11. A facsimile apparatus as set forth in claim 9, wherein the controller waits for one of an NSF signal, a CSI signal, and a DIS signal, and decides the second transmission rate according to a received signal thereamong.

12. A facsimile apparatus as set forth in claim 9, wherein the controller deletes the information stored in the storage upon success in attempting the second communication.

13. A facsimile apparatus as set forth in claim 9, further comprising
- an error code preparing unit that prepares an error code by analyzing the cause of the failure,
- wherein the controller forces the modem to attempt the second communication according to the error code prepared by the error code preparing unit.

14. A facsimile apparatus as set forth in claim 13, wherein the controller forces the modem to attempt the second communication after expiration of a period of time decided by the error code.

15. A facsimile apparatus as set forth in claim 13, wherein the controller forces the modem to try the second communication the number of times decided by the error code.

16. A facsimile apparatus comprising:
- a modem that
  - establishes a first line to a destination facsimile apparatus,
  - attempts through the first line, a first communication specified by the performance of the facsimile apparatus and that of the destination facsimile apparatus, and
  - disconnects the first line and then establishes a second line to the destination facsimile apparatus upon failure in trying the first communication through the first line;
- an error code preparing unit that prepares an error code by analyzing the cause of the failure;
- a storage that stores therein, upon failure in trying the first communication, the error code prepared by the error code preparing unit; and
- a controller that forces the modem to attempt through the second line, a second communication corresponding to the error code stored in the storage.

17. A facsimile apparatus as set forth in claim 16, wherein the controller forces the modem to attempt the second communication after expiration of a period of time decided by the error code.

18. A facsimile apparatus as set forth in claim 16, wherein the controller forces the modem to try the second communication the number of times decided by the error code.

* * * * *